Figure 1:
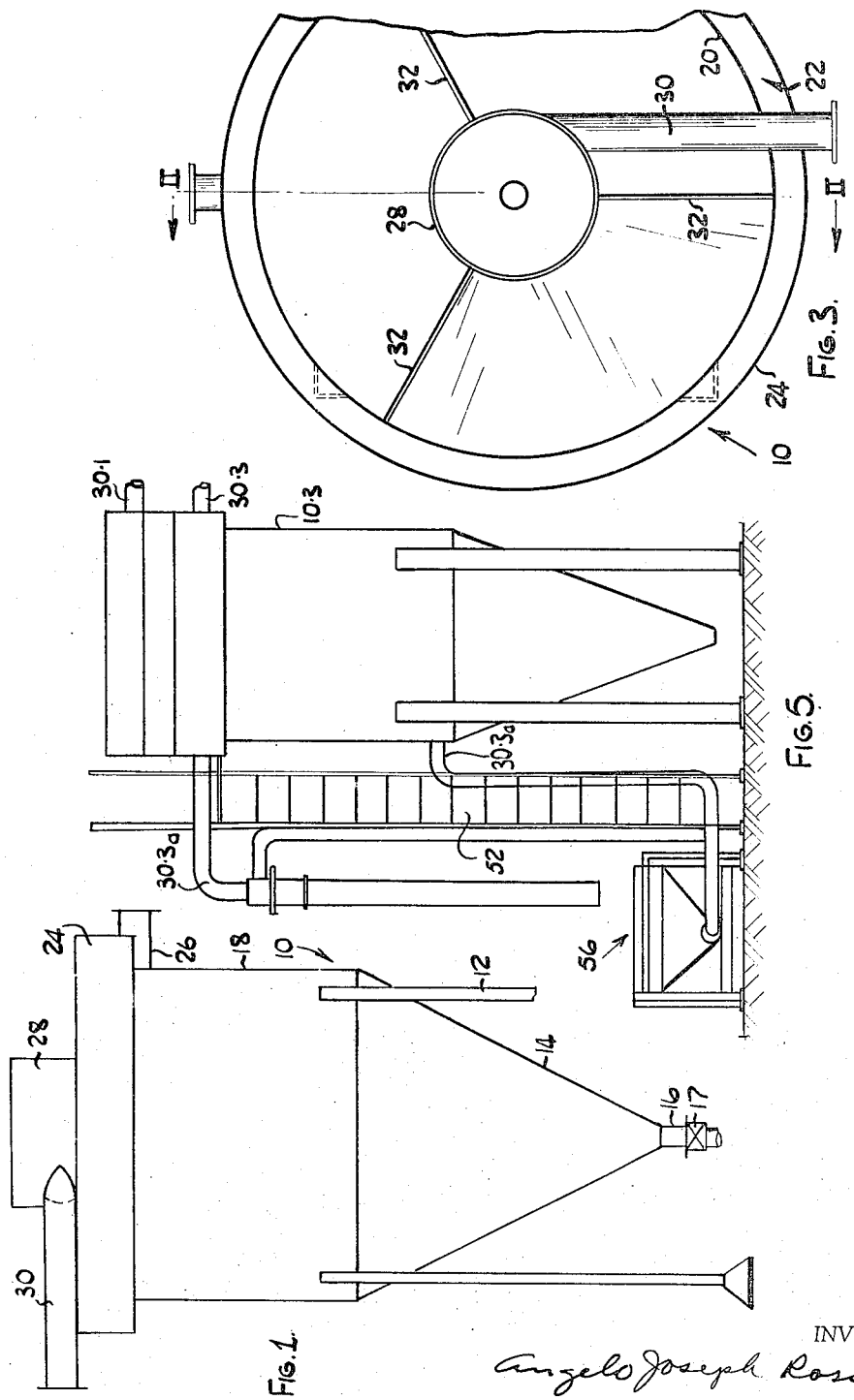

Dec. 13, 1966 A. J. ROSSI 3,291,569
APPARATUS FOR PURIFICATION AND RECLAMATION OF BRINE
Filed June 3, 1963 5 Sheets-Sheet 1

INVENTOR
Angelo Joseph Rossi
BY Wenderoth, Lind
and Ponack ATTORNEYS

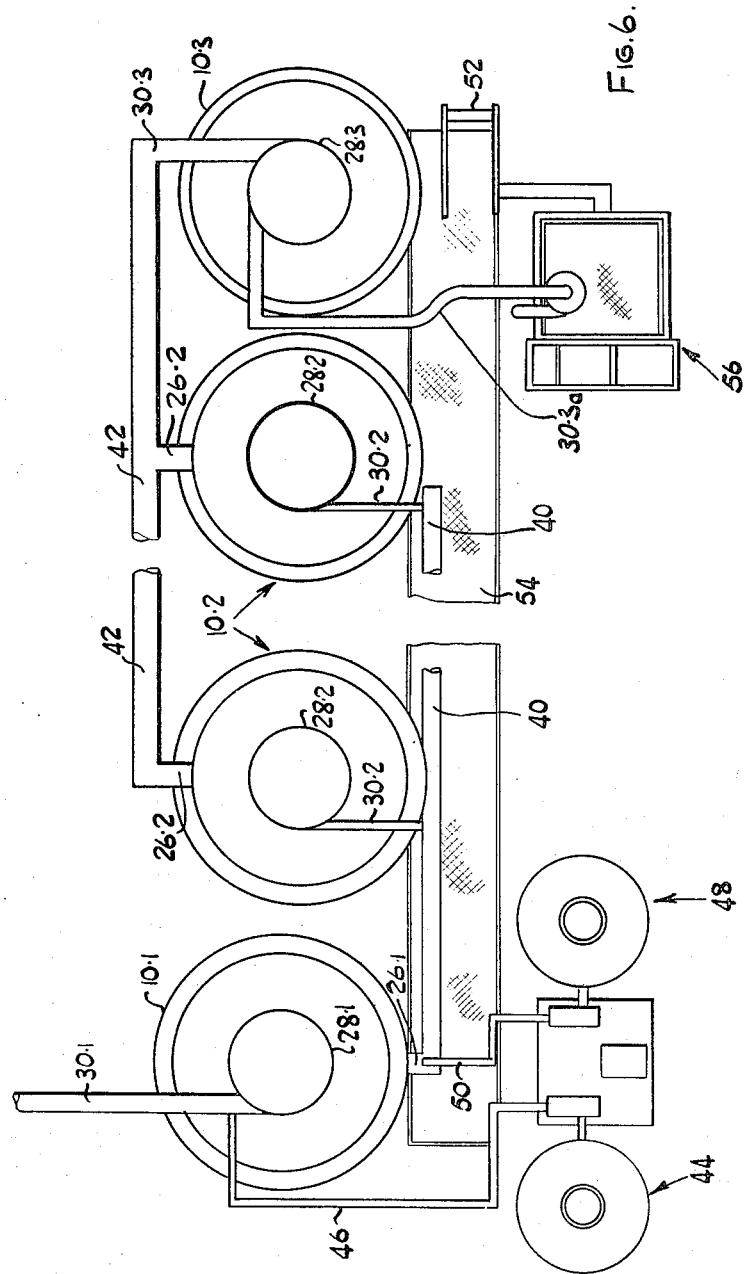

United States Patent Office 3,291,569
Patented Dec. 13, 1966

3,291,569
APPARATUS FOR PURIFICATION AND RECLAMATION OF BRINE
Angelo Joseph Rossi, Port Elizabeth, Cape Province, Republic of South Africa (Via Bruno Buozzi 51, Rome, Italy)
Filed June 3, 1963, Ser. No. 293,550
Claims priority, application Republic of South Africa, June 4, 1962, 2,361/62
6 Claims. (Cl. 23—260)

This invention relates to apparatus suitable for the purification and cleansing of soluble salts or their solutions, by ridding them of chemical, organic, or physical contaminants, by means of chemical and physical treatment.

According to the invention, apparatus suitable for the chemical and physical treatment of salts and their solutions includes: a mixer vessel for mixing chemical additives with a solution of the salt to be treated to provide a mixture and having a solution inlet for the solution to be treated, a first-additive inlet opening, a mixture outlet duct, and a second additive charging opening into the said outlet duct; a plurality of settling vessels each comprising: a central charging well within the vessel, the charging well having an upper tangential charging duct, a downwardly converging lower wall defining a downwardly converging cavity, a lower closable outlet connection leading out of the downwardly converging cavity, and an overflow duct; inlet connections connecting the tangential charging ducts of the several settling vessels in parallel with each other, to the mixture outlet duct of the mixer vessel; a main outlet duct; and outlet connections connecting the overflow ducts, of the several settling vessels, in parallel with each other, to the main outlet duct.

The mixer vessel may be similar in construction to a settling vessel but has its overflow duct constituting the mixer vessel outlet duct, at an elevation slightly higher than the tangential charging ducts of the settling vessels.

In addition, there may be provided a return vessel of similar construction to a settling vessel but having its tangential charging duct connected to the main outlet duct and at an elevation slightly lower than the main outlet duct, and having a further tangential charging opening into the charging well, for the introduction of fresh salts in solution to maintain the concentration of the solution.

The capacity of the mixer vessel in comparison with that of the settling vessels together, is conveniently such that the rate of rising flow of solution with additives through the settling vessels, does not exceed three feet per hour.

If organic contaminants are to be removed from the solution to be treated, then aerating means may be provided having one or more discharge openings in the mixer vessel, or in the settling vessels, or in all of the vessels, to assist in the oxidation of organic impurities in the solution. Alternatively, the mixer and settling vessels, may have their tangential charging openings at an elevation at least one foot higher than their overflow ducts, to provide aeration of the solution by splashing during charging into the vessels.

The types of additives used, will depend upon the impurities in the solution. The amount of additive added as a first additive, will be such, as to provide an alkaline solution in the mixer vessel. The amount of additive added as a second additive, is conveniently such that the pH of the solution in the settling vessels, is between seven and ten.

Where brine, which has been previously used in the treatment of hides and skins, or of fish, is treated, then the first additive is lime with or without chloride of lime, and the second additive is aluminium sulphate. The additives are conveniently added in the form of solutions. The lime solution may have a concentration of one part of lime in ten parts of water by weight. If chloride of lime is used with the lime, then the concentration of the solution is one part of chloride of lime to one hundred parts of lime to one thousand parts of water by weight. The aluminium sulphate has a concentration of ten to twenty parts in one hundred parts of water by weight.

If impurities are to be removed from the salt, in its industrial production, and if the impurities include undesirable magnesium and calcium salts, then the first additive may also be lime with or without chloride of lime, as previously mentioned. The second additive, is then sodium carbonate, conveniently also added in solution. Alternatively, sodium carbonate can be used as the first additive, and caustic soda may be used as a second additive.

If in the industrial production of salt, sulphate impurities are to be removed, then a first additive only is used, in the form of barium carbonate or alternatively of barium chloride.

The invention will now be described with reference to the accompanying drawings; arranged for the regeneration and rejuvenation of brine, previously used in the treatment of hides and skins.

Figure 2:
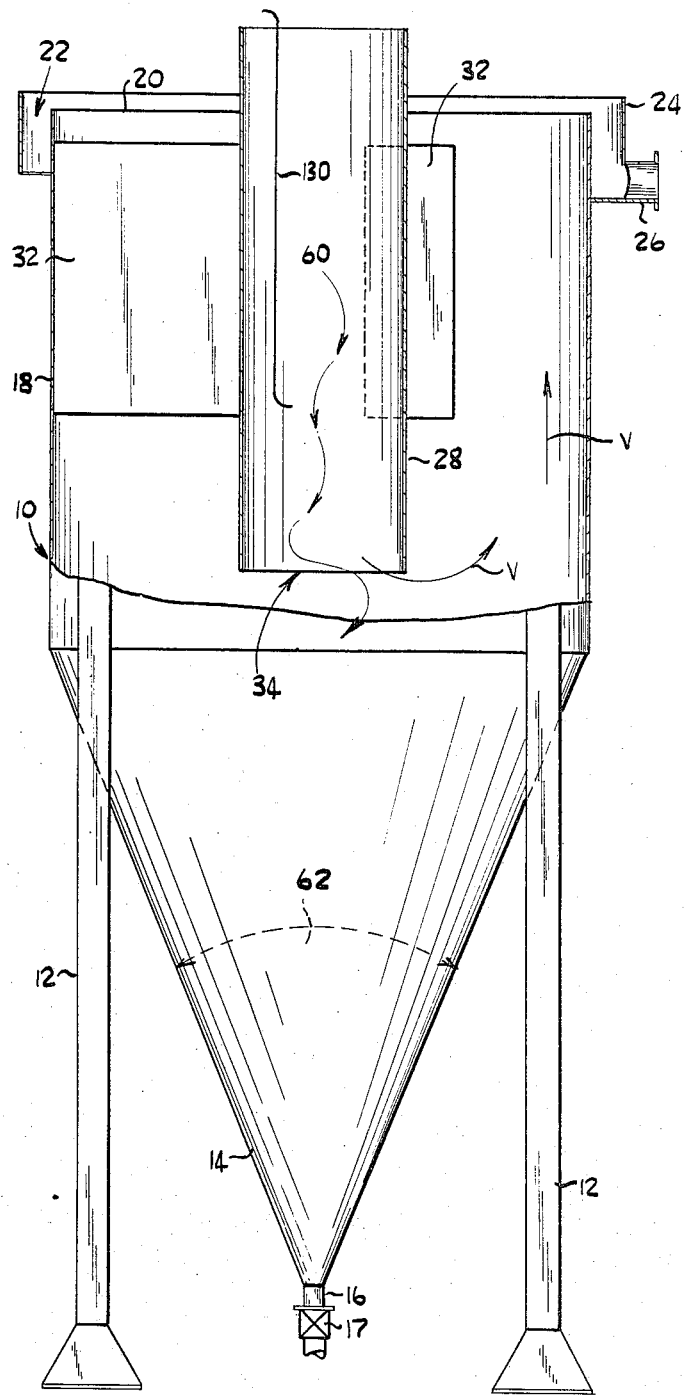
Figure 4:
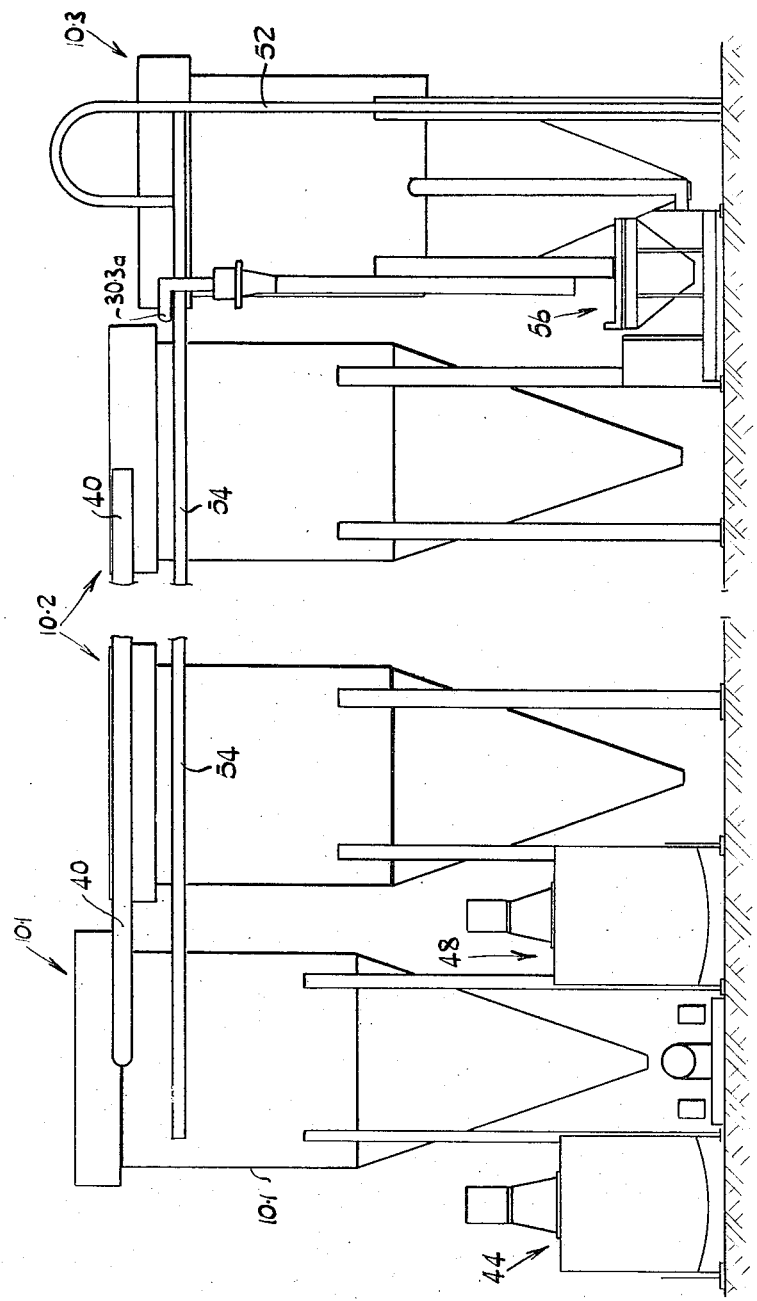
Figure 7:
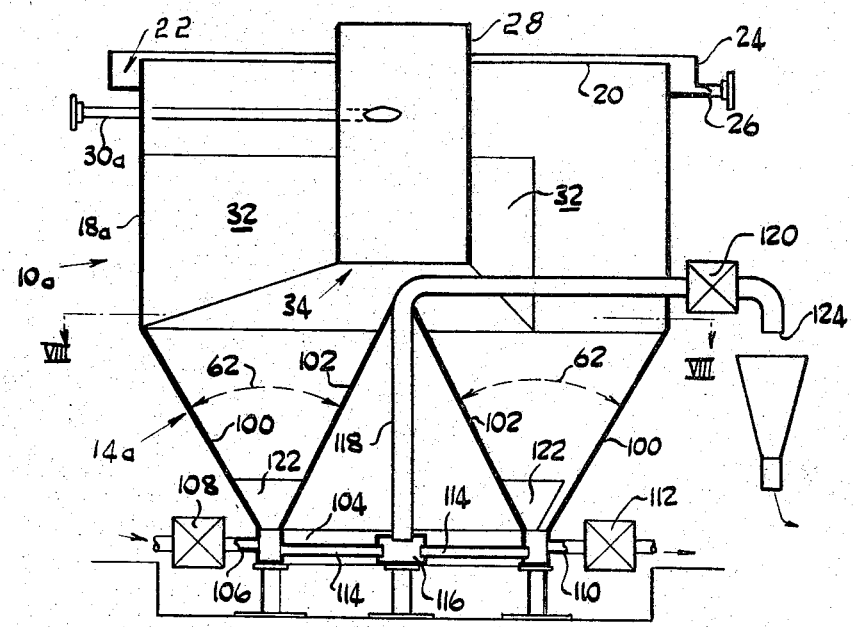
Figure 8:
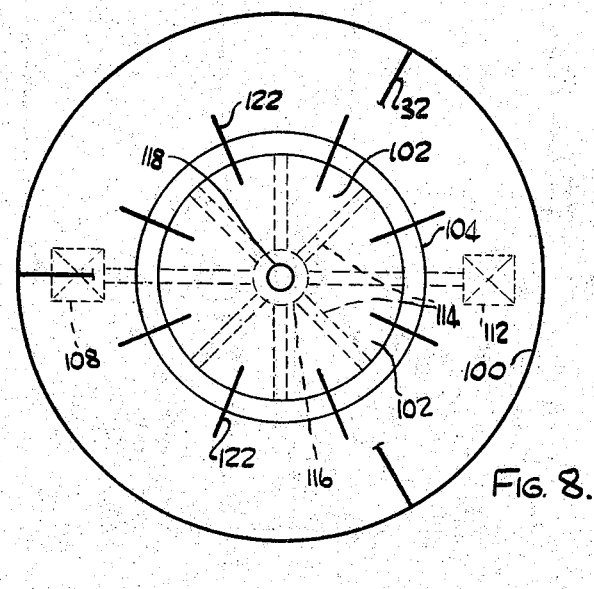

In the drawings:
FIGURE 1 shows a side elevation of a vessel;
FIGURE 2 shows a part-sectional side elevation at II—II in FIGURE 3;
FIGURE 3 shows a plan view corresponding to FIGURES 1 and 2;
FIGURE 4 shows a part side elevation of an installation, comprising a plurality of vessels;
FIGURE 5 shows a part end elevation corresponding to FIGURE 4;
FIGURE 6 shows a part plan view corresponding to FIGURES 4 and 5;
FIGURE 7 shows diagrammatically a sectional side elevation of an alternative vessel; and
FIGURE 8 shows a sectional plan at VIII—VIII in FIGURE 7.

Referring to FIGURES 1, 2 and 3 of the drawings, reference numeral 10 refers generally to a vessel supported on legs 12 and having a conical lower portion 14 with outlet pipe 16 and valve 17. The vessel has an upper cylindrical portion 18 whose upper edge 20 can act as an overflow weir into overflow channel 22 defined by outer wall 24. The channel 22 has an outlet duct 26. Centrally disposed within the cylindrical portion 18, there is provided a central charging well 28 having a tangential charging duct 30 leading into the well at an elevation higher than that of the upper edge 20 of the cylindrical portion 18. The charging well 28 is supported by radial plates 32 fast with the cylindrical portion 18 and has a downwardly directed outlet opening 34.

Suitable pipes and valves may be connected to flanges attached to the outlet pipe 16, to the outlet duct 26, and to tangential charging duct 30, if desired, to control the flow of brine through the installation. In particular, a valve 17 may be connected to the outlet pipe 16, whereby solids precipitated in the conical lower part 14 can be discharged.

Referring further to FIGURES 4, 5, and 6 of the drawings, there is shown diagrammatically an installation for the purification of brine and comprising the combination of a plurality of vessels as shown in FIGURES 1, 2, and 3. The vessel 10.1 is a mixer vessel, vessels 10.2 are settling vessels, and vessel 10.3 is a return vessel in which recharging of brine may take place, to strengthen its concentration.

It will be noted that the outlet duct 26.1 (see FIGURE 6) of the mixer vessel is connected to charging header 40 to which is connected the tangential charging ducts 30.2 of the settling vessels 10.2.

Again, the outlet ducts 26.2 of the settling vessels 10.2 are connected to delivery header 42 which in turn feeds into tangential charging duct 30.3 of return vessel 10.3. The mixer vessel 10.1 is slightly higher than the settling vessels 10.2, which in turn are slightly higher than the return vessel 10.3. This ensures that during charging of the brine from one vessel to another, aeration, and hence oxidation of oxidisable contaminants in the brine is taking place.

An automatic alkali mixer and doser 44 is provided, connected to deliver via pipe 46 whose outlet constitutes the first additive inlet opening into the tangential charging duct 30.1 of mixer vessel 10.1. Another mixer and doser 48 delivers via pipe 50 into the upstream end of charging header 40. The outlet end of the pipe 50 constitutes the second additive inlet opening. Reference numeral 52 refers to a ladder leading to elevated grid working platform 54. The brine may be brought to the required concentration by the introduction of fresh salt in brine suspension into return vessel 10.3 via tangential feed duct 30.3a connected to mixer unit 56.

In use, brine which has already been used in the treatment of foodstuffs, for example fish, or of hides and skins, is fed into the installation via charging duct 30.1. Prior to entering the charging well 28.1, the brine has added to it a lime and chloride of lime solution in sufficient quantities to render the mixture alkaline.

After thorough mixing in the mixing vessel 10.1, the mixture is then dosed with an acid solution of 10% to 20% solution by weight of aluminium sulphate, by means of doser 48, to bring the pH down to between seven and ten. The flow from the mixer vessel 10.1 is split equally between the settling vessels 10.2 such that the rising velocity V (see FIGURE 2) of the brine in the settling vessels does not exceed three feet per hour. The brine mixture and flock formed is carried down in spiral fashion in the direction of arrow 60 (see FIGURE 2) inside charging wells 28.2 of settling vessels 10.2. Details are shown in relation to charging well 28 in FIGURE 2.

The slope of the walls of the conical portion 14 is such that the included angle 62 preferably does not exceed 45°. In practice, this affords an advantage in that suspended matter will settle down into the cone, from which it can easily be discharged through outlet pipe 16 with relatively little loss of brine.

For installations in the northern hemisphere, the tangential inflow into the charging wells of the vessels, via the tangential charging ducts, will preferably be clockwise when viewed from above. For installations in the southern hemisphere, the tangential charging ducts are conveniently arranged to give anti-clockwise flow into the charging wells.

In FIGURES 7 and 8 of the drawings, is shown an alternative settling vessel 10a, which it will be noted is of squat form, and is used in circumstances where head room is restricted. Like parts have been numbered in like fashion, but structural variations have been given different numbers. It will be noted that instead of having a bottom 14 of inverted conical shape, the vessel 10a has a bottom, defining an annular cavity tapering downwardly, and being of inverted conical cross-section. The lower part 14a has an outer downwardly converging circular wall 100 and has an inner circular upwardly converging wall 102. The walls 100 and 102 define between them an annular cavity converging downwardly at an angle 62 which conveniently does not exceed 45°. At the bottom of the cavity, there is provided a header channel 104 having an inlet pipe 106 provided with a stop valve 108. The channel also has a flushing outlet pipe 110 with stop valve 112. Radial pipes 114 are provided communicating with a central box 116 at the bottom of rising pipe 118 having a delivery stop valve 120. In the bottom of the conical section cavity defined by walls 110 and 102, there are provided plates 122 acting as baffles to reduce circulating flow in the bottom of the cavity.

In operation, solids, sludge, and flock will settle to the bottom of the cavity, and by opening stop valve 120, the solids which have settled in the bottom of the cavity and in the header channel 104 will be carried along with the outflow under the pressure of the liquid in the vessel. Flow will take place from the header channel 104, along the pipes 114 and up the rising pipe 118, and out of the discharge end 124. If the bottom of the vessel is to be flushed, then the valves 108 and 112 are opened, and flow is directed into the pipe 106, and out of the pipe 110.

In other respects, the method of use is the same as that already described for the installation comprising the other vessels.

Referring again to FIGURE 2, an aerating tube 130 is provided for discharging air under pressure into the vessel, to oxidise organic impurities in the solution.

I claim:
1. Apparatus suitable for the chemical and physical treatment of salts and their solutions and which includes:
   (a) a mixer vessel for mixing chemical additives with a solution of the salt to be treated to provide a mixture, and having
      (i) a solution inlet for the solution to be treated,
      (ii) a first additive inlet opening,
      (iii) a mixture outlet duct, and
      (iv) a second additive charging opening into the said outlet duct;
   (b) a plurality of settling vessels each comprising:
      (i) a central charging well within the vessel, the charging well having an upper tangential charging duct,
      (ii) a downwardly converging lower wall defining a downwardly converging cavity,
      (iii) a lower closable outlet connection leading out of the downwardly converging cavity, and
      (iv) an overflow duct;
   (c) inlet connections connecting the tangential charging ducts of the several settling vessels in parallel with each other, to the mixture outlet duct of the mixer vessel;
   (d) a main outlet duct; and
   (e) outlet connections connecting the overflow ducts, of the several settling vessels, in parallel with each other, to the main outlet duct.

2. Apparatus according to claim 1 in which the capacity of the mixer vessel in comparison with that of the settling vessels together is such that the rate of rising flow of solution with additive through the settling vessels, does not exceed three feet per hour.

3. Apparatus according to claim 1 in which there is provided aerating means for discharging air into the solution to assist in the oxidation of organic impurities in the solution.

4. Apparatus according to claim 1 in which the mixer vessel is similar in construction to a settling vessel but has its overflow duct constituting the mixer vessel outlet duct, at an elevation slightly higher than the tangential charging ducts of the settling vessels.

5. Apparatus according to claim 4 in which there is provided a return vessel of similar construction to a settling vessel but having
   (a) its tangential charging duct connected to the main outlet duct and at an elevation slightly lower than the main outlet duct, and
   (b) a further tangential charging opening into the charging well for the introduction of fresh salts in solution to maintain concentration of the solution.

6. Apparatus according to claim 4 in which the mixer and settling vessels have their tangential charging openings at an elevation at least one foot higher than their overflow ducts, to provide aeration of the solution by splashing during charging into the vessels.

References Cited by the Examiner
UNITED STATES PATENTS

| | | | |
|---|---|---|---|
| 633,688 | 9/1899 | Delattre | 23—260 |
| 2,191,467 | 2/1940 | Haywood | 23—260 |
| 2,308,670 | 1/1943 | Bolton | 210—512 |
| 2,624,654 | 1/1953 | Hirsch | 23—42 |
| 3,147,072 | 9/1964 | Thomsen | 23—42 |
| 3,186,802 | 6/1965 | Gerrard | 23—260 |

MORRIS O. WOLK, *Primary Examiner.*

BENJAMIN HENKIN, *Examiner.*

G. OZAKI, M. E. ROGERS, *Assistant Examiners.*